Nov. 10, 1931.     W. H. RADFORD     1,831,195
TRANSMISSION
Filed Aug. 13, 1929     2 Sheets-Sheet 1
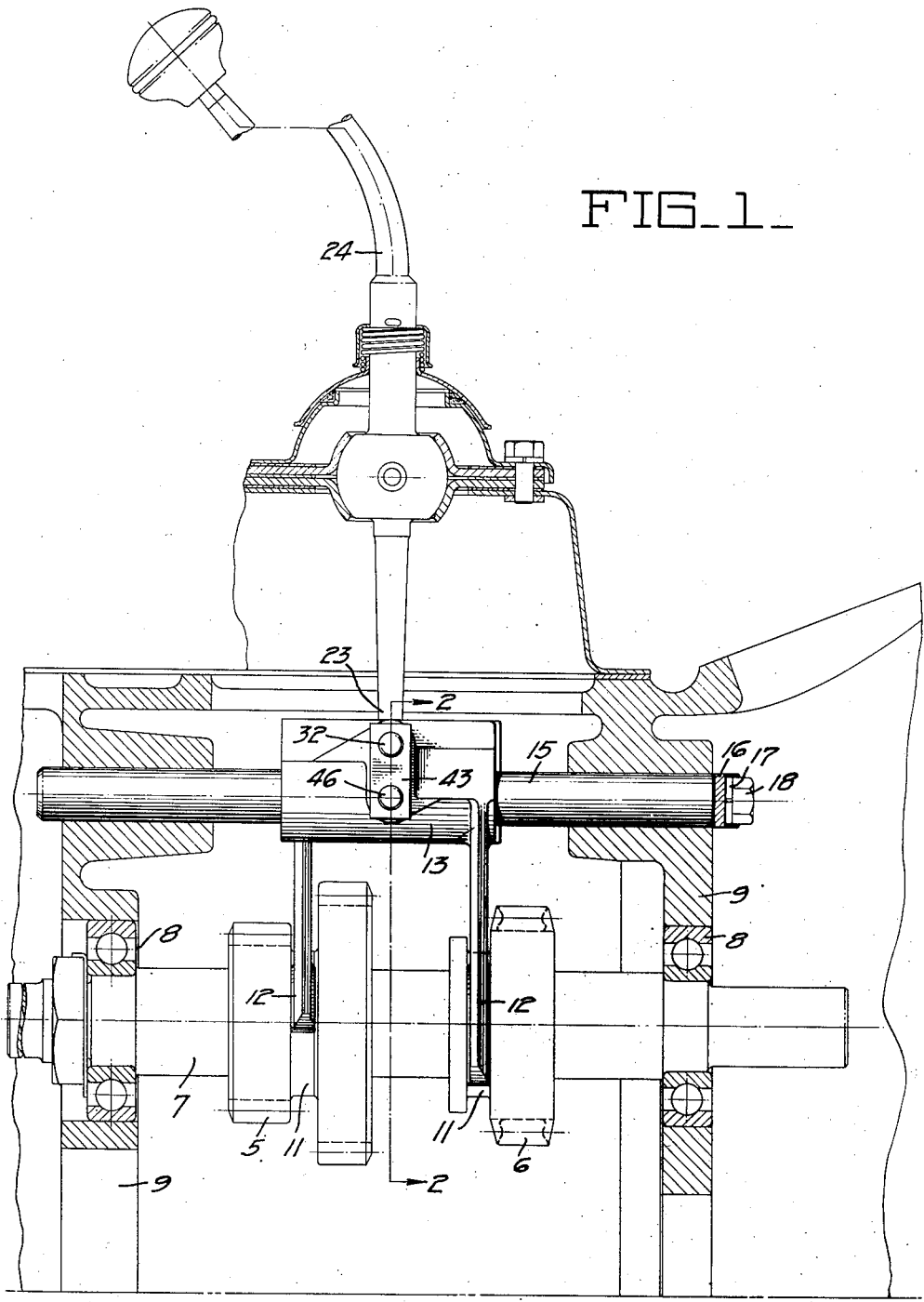
FIG_1_

Nov. 10, 1931.  W. H. RADFORD  1,831,195
TRANSMISSION
Filed Aug. 13, 1929  2 Sheets-Sheet 2
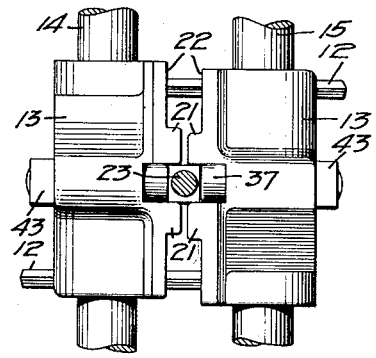
FIG_4_
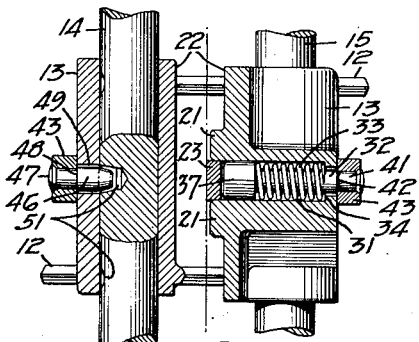
FIG_3_
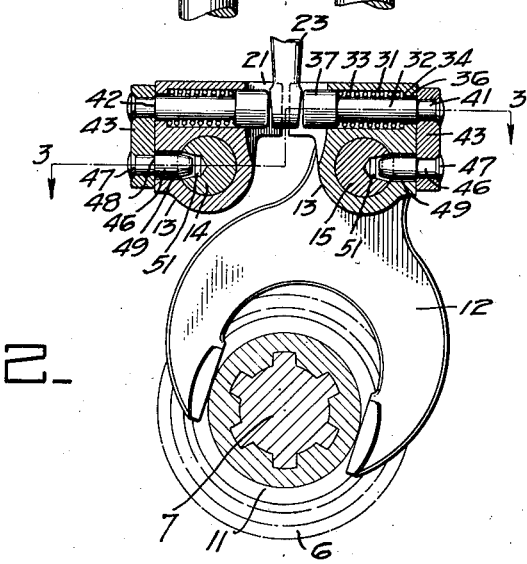
FIG_2_
INVENTOR
William H. Radford
BY
White, Prost, Fleh & Lothrop
ATTORNEYS Patented Nov. 10, 1931

1,831,195

UNITED STATES PATENT OFFICE

WILLIAM H. RADFORD, OF SAN LEANDRO, CALIFORNIA, ASSIGNOR TO CATERPILLAR TRACTOR CO., OF SAN LEANDRO, CALIFORNIA, A CORPORATION OF CALIFORNIA

TRANSMISSION

Application filed August 13, 1929. Serial No. 385,557.

My invention relates to transmission mechanisms. It is particularly applicable to automotive vehicles such as tractors and is especially concerned with sliding gear transmissions having a selective shifting mechanism. A transmission of like character is disclosed in my co-pending application, Serial No. 310,964 filed October 8, 1928, of which this is a continuation in part.

It is an object of my invention to provide an improved means for selectively positioning the gears in a sliding gear transmission.

Another object of my invention is to provide a simplified gear shift mechanism in which the shifting of the gears is accomplished in a more direct manner.

A further object of my invention is to provide a shifting mechanism which is readily latched in any one of certain predetermined positions.

The invention possesses other advantageous features, some of which with the foregoing will be set forth at length in the following description where I shall outline in full that form of the transmission of my invention, which I have selected for illustration in the drawings, accompanying and forming part of the present specification. In said drawings I have shown one form of transmission embodying my invention, but it is to be understood that I do not limit myself to such form since the invention, as set forth in the claims, may be embodied in a plurality of forms.

In the drawings to which I have made reference, Fig. 1 is a side elevation of a transmission embodying a form of my invention.

Fig. 2 is a cross section through the transmission illustrated in Fig. 1 along the line 2—2 thereof.

Fig. 3 is a section through the mechanism illustrated in Fig. 2 along the line 3—3.

Fig. 4 is a plan view of a portion of the shifting mechanism utilized in connection with the transmission of my invention.

My invention may be briefly characterized as comprising the provision of a member slidably mounted to engage and to selectively position various of the usual gears provided in a transmission. In combination with the sliding member means are provided for securing the sliding member in any one of a number of predetermined positions.

In the form of transmission with which I have chosen to disclose as the preferred form of my invention, gears 5 and 6 are slidably mounted upon a shaft 7. These gears are adapted to be engaged with other gears not shown to provide a suitable variable speed transmission. The shaft 7 upon which they are slidable is conveniently journalled by roller bearings 8 in a transmission housing indicated generally at 9. This housing is secured in any desired manner within the automotive device with which the transmission is being utilized.

Since in automotive devices the speed and torque desired varies with the conditions of operation, and, since it has been previously found that such a variation is conveniently provided by means of a sliding gear transmission such as I have here disclosed, I accordingly provide means for varying the position of the gears 5 and 6 and thus vary the speed and torque transmitted. This I preferably accomplish by forming a collar 11 upon each of the gears 5 and 6 in such a manner that jaws 12 which extend from shifting members 13 are readily engaged in their respective collars.

In accordance with my invention I prefer that the shifting members 13 be slidably mounted upon shafts 14 and 15. These shafts usually extend between the opposite walls of the housing 9 and are non-rotatably secured together by means of a lock bar 16 retained in place by lock washers 17 and lock nuts 18.

As is particularly shown in Fig. 4 I preferably form the sliding members 13 with a plurality of shoulders 21 which extend from sides 22 of the members. These shoulders are preferably spaced apart a sufficient distance and are provided to receive an extending end 23 of a universally mounted gear shift lever 24. The mounting of the gear shift lever 24 is conveniently provided as I have disclosed in my previously mentioned co-pending application.

In the position illustrated in Fig. 4 the sliding members 13 and the gear shift lever are in such a position that the transmission may be said to be in neutral. It is to be noted that the selective sliding of one of the members is accomplished by moving the extending end 23 of the gear shift lever transversely so that it passes out of engagement with the extending shoulders 21 on one of the members into full engagement with the shoulders on the other member. When in this position the member with whose shoulders it is in full engagement is readily moved and slid along the shaft upon which it is positioned.

In accordance with my invention I provide means to retain the other member in position when the lever is moved to shift the gears. This retention I preferably accomplish by suitable locking means for securing the member not being slid in position upon the shaft. This means I provide in the following manner:

A cylindrical passage 31 is formed in each of the members 13 in which is positioned a plunger 32. The plunger is of less diameter than the passage in which it is positioned and I preferably utilize the intervening space to provide a spring 33 extending about the plunger. One end of the spring 33 is adapted to abut the shoulder 34 formed by a reduced portion 36 of the aperture which also serves as a bearing or guide for the plunger. The other end of the spring is preferably in abutment with a piston 37 provided upon the plunger. This piston is adapted to extend materially from the aperture in such a manner that it is normally in abutment with the projecting end of the gear shift 23. The other end 41 of the plunger is usually reduced slightly in diameter in such a manner that a shoulder 42 is provided. An apertured strip 43 is positioned upon the plunger end 41 in abutment with the shoulder 42. The strip is usually retained upon the plunger by upsetting the extending end 41 as is indicated.

A latch 46 is conveniently secured to the strip by upsetting an extending end 47 thereof in such a manner that a shoulder 48 provided upon the latch is drawn into close abutment with the strip. The latch is adapted to be projected into a passage 49 in the sliding member 13 and to extend through into one of a number of apertures 51 provided in the stationary shaft so as to lock the transmission in the selected position.

In operation a transverse movement of the gear shift lever serves to move the projecting end 23 thereof into abutment with the piston 37. This normally results in a sliding movement of the piston and plunger in the aperture in such a manner that the latch is withdrawn from the aperture in which it is positioned in the stationary shaft thereby unlocking member 13 for shifting along the stationary shaft to another position of the gears, the latch finally engaging another suitable aperture to lock member 13 in shifting position. Preferably the extent of the shoulders 21 is sufficient to confine the extending end of the gear shift lever so that it is retained in shifting engagement with member 13 during the shift. Thus upon a movement of either of the gears 5, 6 from a position other than the neutral position member 13 is slid along the stationary shaft by the shift lever to a desired position. Upon completion of the shift the extending end of the gear shift lever is normally released from full engagement with the aperture defined by the shoulders 21 in the member 13 by the spring 33 which through piston 37 moves end 23 into contact with the side 22 of the opposite member. The end of the shift lever is thus retained in an operative position with respect to the member which has been selectively positioned and the member 13 is locked in shifted position.

I claim:

1. In a transmission, a shaft, a member slidable on said shaft, a resiliently mounted plunger in said member, a bolt slidable in said member to engage said shaft, means for co-operably joining said plunger and said bolt, and a shift lever adapted to engage said plunger and said member whereby said member is slid along said shaft.

2. In a transmission, a gear shifter and lock therefor, having a movable element including substantially parallel conjoined pins movable upon shifting movement of said gear shifter.

3. In a transmission, a gear shifter and a lock therefor, having means movable with said shifter including substantially parallel conjoined pins movable upon shifting movement of said gear shifter and spring means operating on said pins.

4. In a transmission, a gear shifter and a lock therefor, comprising means movable with said shifter including substantially parallel conjoined pins and a stationary element cooperating with said pins.

5. In a transmission, a shift lock including substantially parallel conjoined pins, a stationary element cooperating with one pin and a movable element cooperating with the other pin.

6. In a transmission, a shaft having pin holes therein, a gear shifter slidable on said shaft, a pin in said shifter adapted to enter into said holes, and means to operate said pin.

7. In a transmission, a shaft having pin holes therein, a gear shifter slidable on said shaft, a pin in said shifter, a spring urging said pin into said hole, and means to remove said pin from said hole.

8. In a transmission, a shaft having pin holes therein, a gear shifter slidable on said shaft, a pin in said shifter adapted to enter said holes, a second pin attached to said first pin, and a spring operating on said second pin.

9. In a transmission, a shaft having pin holes therein, a gear shifter slidable on said shaft, a pin in said shifter adapted to enter said holes, a second pin attached to said first pin, and operating means for said second pin.

In testimony whereof, I have hereunto set my hand.

WILLIAM H. RADFORD.